US006112606A

United States Patent [19]

Shin

[11] Patent Number: 6,112,606

[45] Date of Patent: Sep. 5, 2000

[54] PISTON SUPPORTING STRUCTURE FOR STIRLING CYCLE MACHINE

[75] Inventor: Dong-Koo Shin, Kyonggi-do, Rep. of Korea

[73] Assignee: LG Electronics Inc., Seoul, Rep. of Korea

[21] Appl. No.: 08/711,941

[22] Filed: Sep. 4, 1996

[30] Foreign Application Priority Data

Sep. 4, 1995 [KR] Rep. of Korea .................... 95-23839

[51] Int. Cl.[7] .................................................. F16H 21/22

[52] U.S. Cl. ................................ 74/44; 60/517; 92/143

[58] Field of Search ................................ 74/44; 60/517; 92/143

[56] References Cited

U.S. PATENT DOCUMENTS

| | | | |
|---|---|---|---|
| 4,055,951 | 11/1977 | Davoud et al. | 60/514 |
| 4,712,378 | 12/1987 | Nakayama | 60/525 |
| 5,255,521 | 10/1993 | Watanabe | 60/520 X |

*Primary Examiner*—Allan D. Herrmann

[57] ABSTRACT

The present invention is intended to prevent vibration of a piston while reciprocating the piston without frictional contact by replacing a cross head for preventing the vibration of the piston with a leaf spring fixed by a rod at the lower end of the piston and a cylinder, and applied to a stirling cycle machine.

7 Claims, 7 Drawing Sheets

PISTON SUPPORTING STRUCTURE FOR STIRLING CYCLE MACHINE

TECHNICAL FIELD

The present invention relates to a piston supporting structure for a stirling cycle machine, which prevents vibration of the piston and maintains reciprocal movements of the piston without frictional contact with a cylinder, by substituting a circular leaf spring for a cross head for preventing vibration of the piston with frictional contact with the cylinder of a stirling cycle machine.

BACKGROUND OF THE INVENTION

As shown in FIG. 1, a stirling cycle machine having a conventional piston supporting structure is provided with a piston driving mechanism 2 for generating a driving force to reciprocate a piston 1, a case 4 having a cross head cylinder 3 in the upper part thereof for protecting the piston driving mechanism 2, the piston 1 having a piston seal 5 on the outer circumferential surface thereof and being reciprocated by the driving force generated by the piston driving mechanism 2, a cross head 6 for connecting the piston driving mechanism 2 to the piston 1 to transfer the driving force generated by the piston driving mechanism 2 to the piston 1, and a guiding cross head seal 7 installed on the outer circumferential surface of the cross head 6, for reciprocating in friction with the inner wall of the cross head cylinder 3 to prevent vibration of the piston 1 during the reciprocal movement of the piston 1. Reference numeral 8 denotes a displacer, reference numeral 9 denotes a radiator, reference numeral 10 denotes a regenerator, and reference numeral 11 denotes a heat absorbing portion.

In the stirling cycle machine provided with the conventional piston supporting structure, as shown in FIG. 1, the piston 1 having the piston seal 5 on the outer circumferential surface reciprocates while the cross head 6 for connecting the piston driving mechanism 2 to the piston 1 moves up and down in the cross head cylinder 3 formed in the upper part of the case 4, when a driving force is generated by the piston driving mechanism 2 in the case 4 to reciprocate the piston 1 in the stirling cycle machine.

The piston driving mechanism 2 includes a crank shaft 2*a* connected to a shaft of driving motor (not shown), a rotating plate 2*b* being coupled at the center portion thereof to the crank shaft 2*a*, a first shaft pin 2*e* mounted at a side portion of the rotating plate 2*b*, an arm 2*c* linked between the shaft pin 2*e* and a portion of the cross head 6 with a second shaft pin 2*d* linked thereto, an idle rotating plate 2*f* mounted at a side portion of the shaft pin 2*e*, and a driving shaft 2*g* for moving the displacer 8 vertically with a coupling 2*i* connected to the displacer rod 2*h*. The displacer rod 2*h* is arranged to pass through the hollow rod portion 1*a* of the piston 1.

Here, in some cases, the piston 1 vibrates by the driving force of the piston driving mechanism 2 in the driving direction while being reciprocated by the piston driving force of the piston driving mechanism 2. However, the guiding cross head seal 7, which is installed on the outer circumferential surface of the cross head 6 reciprocating in the cross head cylinder 3, is brought into frictional contact with the cross head cylinder 3 during the reciprocal movement of the cross head 3, thereby preventing the vibration of the piston 1.

The operation of the piston driving mechanism 2 will now be described. When the crank shaft 2*a* is driven by a motor, the rotating plate 2*b* rotates with the first shaft pin 2*e* displaced from the center of the rotating plate 2*b*. With the rotation of the shaft pin 2*e,* the arm 2*c* linked between the shaft pin 2*e* and a portion of the cross head 6 permits vertical movement of the piston 1 along with the cross head 6. At the same time, the idle rotating plate 2*f* is rotated eccentrically to rotate the displacer driving shaft 2*g*. The rotation of the displacer driving shaft 2*g* is translated to the linear movement of the displacer rod 2*h* by the coupling 2*i*. The displacer rod 2*h* penetrating the hollow rod portion la of the piston 1 allows the vertical movement of the displacer 8 along with the vertical movement of the piston 1. Thus, rotation of the crank shaft 2*a* enables the up and down movement of the cross head 6 and piston 1 by the rotating plate 2*b,* as well as linear movement of the displacer 8 by the rotation of the idle rotating plate 2*f.*

However, in the conventional piston supporting structure for a stirling cycle machine, the cross head seal 7 is installed on the outer circumferential surface of the cross head 6 to prevent the vibration of the piston 1 while the piston 1 is being reciprocated by the piston driving mechanism 2. However, though the vibration of the piston 1 is prevented by the cross head seal 7 in frictional contact with the inner wall of the cross head cylinder 3, the friction between the cross head seal 7 and the cross head cylinder 3 generates heat, thus requiring exploration of an additional method for radiating the heat. Another problem with the conventional piston supporting structure is difficulty in machining and dimension management of the cross head cylinder 3.

SUMMARY OF THE INVENTION

To overcome the above conventional problems, the present invention is intended to prevent vibration of a reciprocating piston without frictional contact by replacing a cross head for preventing the vibration of the piston with a leaf spring fixed by a rod at the lower end of the piston and a cylinder. The structure and operational effects of the present invention will be described in connection with the attached drawings.

DETAILED DESCRIPTION OF THE INVENTION

Figure 1:
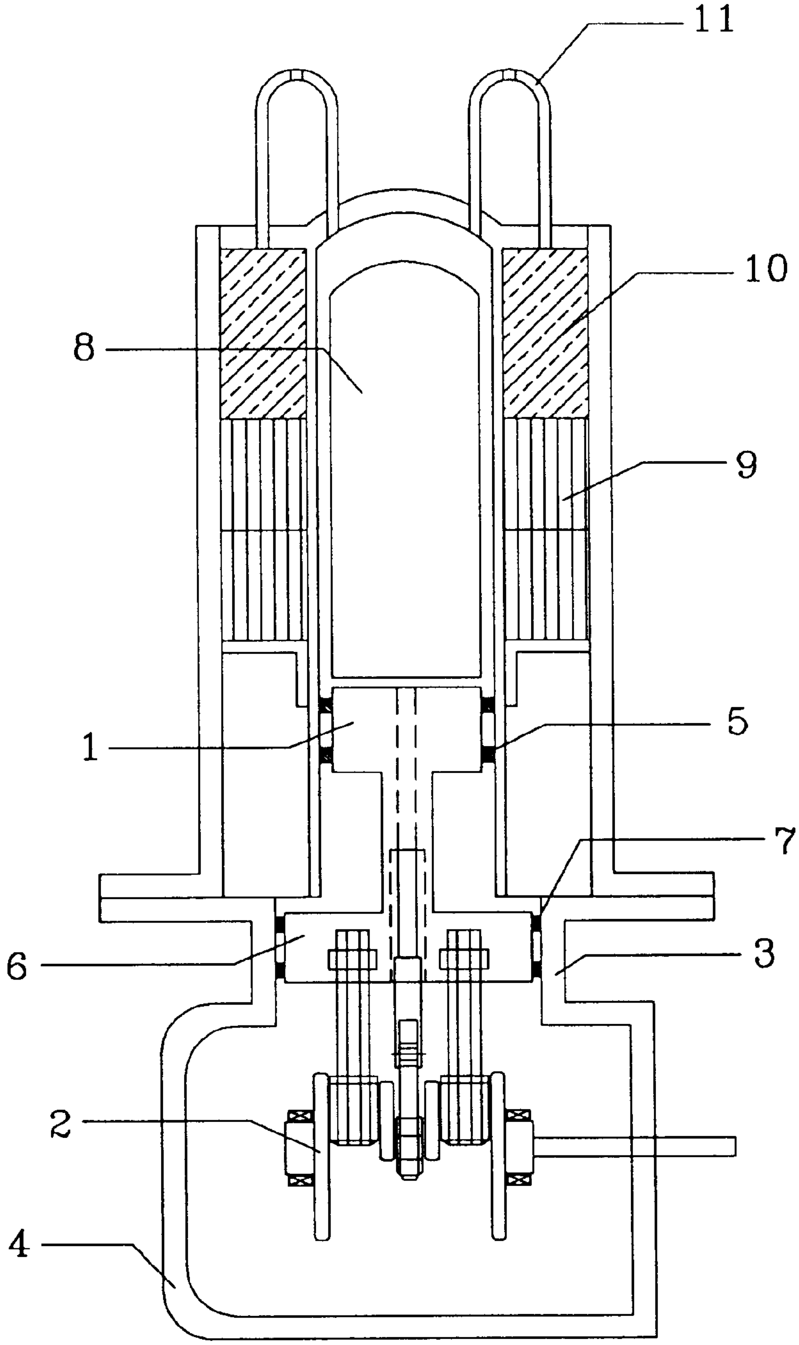
FIG. 1 is a sectional view of a stirling cycle machine having a conventional piston supporting structure.

FIGS. 2 through 4A–4C illustrate the structure of a stirling cycle machine having a piston supporting structure. Throughout the drawings, the same reference numerals denote that the same constitutional elements. Note that the piston driving mechanism 2 shown in FIGS. 1 to 5 has the same or like construction, except with respect to the cross head 6. The cross head 6 used in the present invention has smaller diameter than that of the prior art (as seen in the drawings), in order to avoid frictional contract with the cross head cylinder 3. A leaf spring 12 being the piston supporting structure includes an inner rib 13, at its radial inner part, supported by a hollow rod portion 1*a* at the lower end of the piston 1, an outer rib 14, in its outer part, fixed by a cylinder 3, and arms 15 for connecting the inner rib 13 to the outer rib 14.

Figure 2:
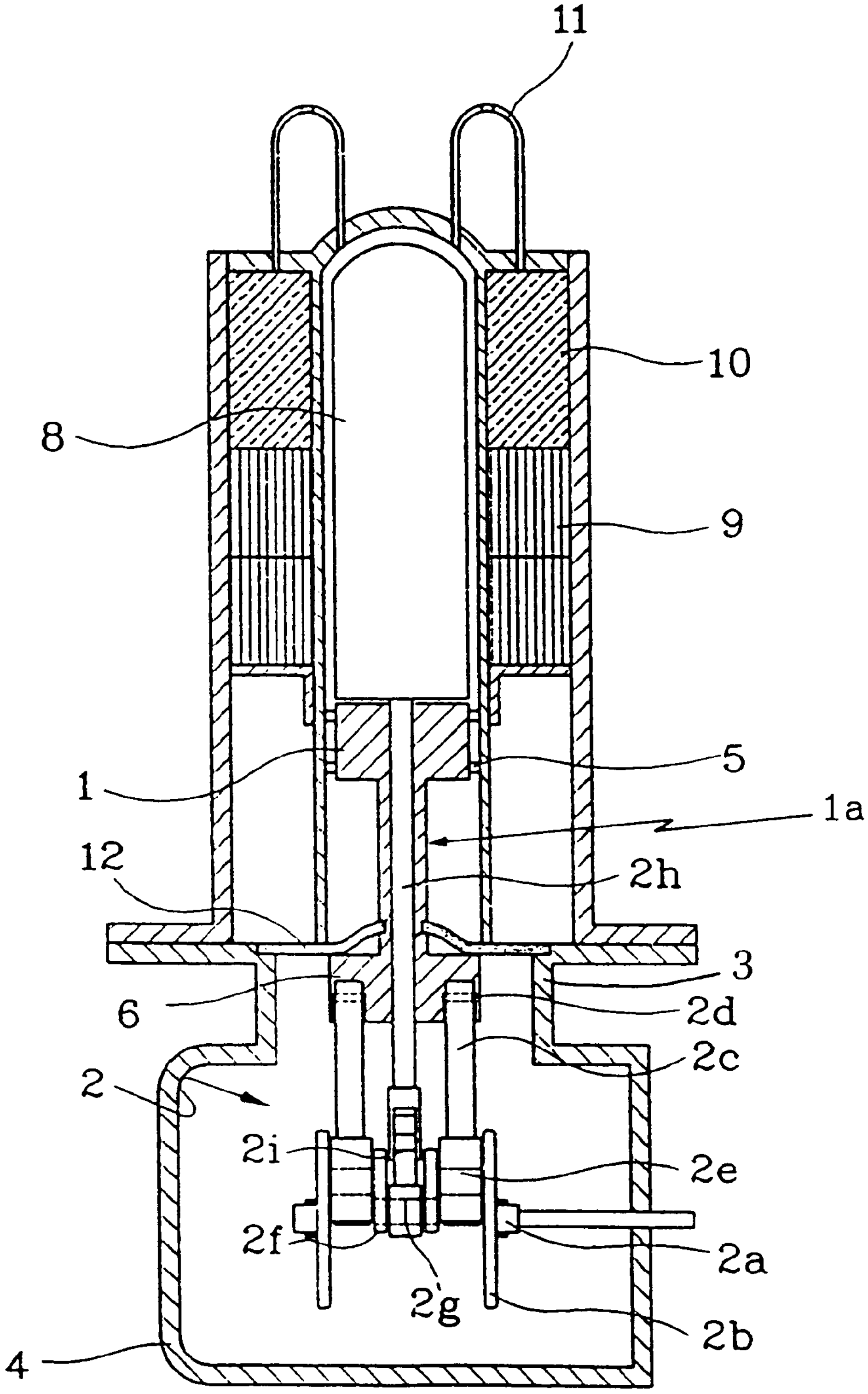
FIG. 2 is a sectional view of a stirling cycle machine having a piston supporting structure of the present invention.
Figure 3:
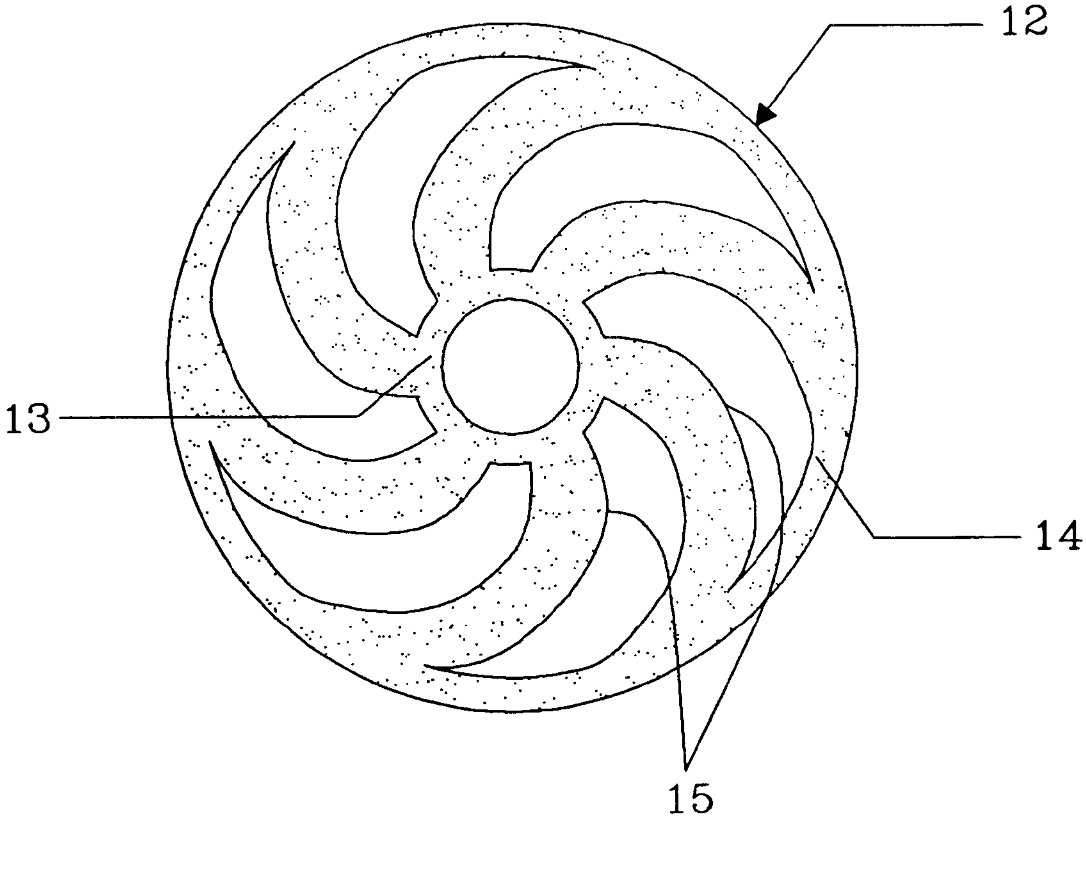
FIG. 3 is a plan view of the piston supporting structure of the present invention in the stirling cycle machine.
Figure 4A:
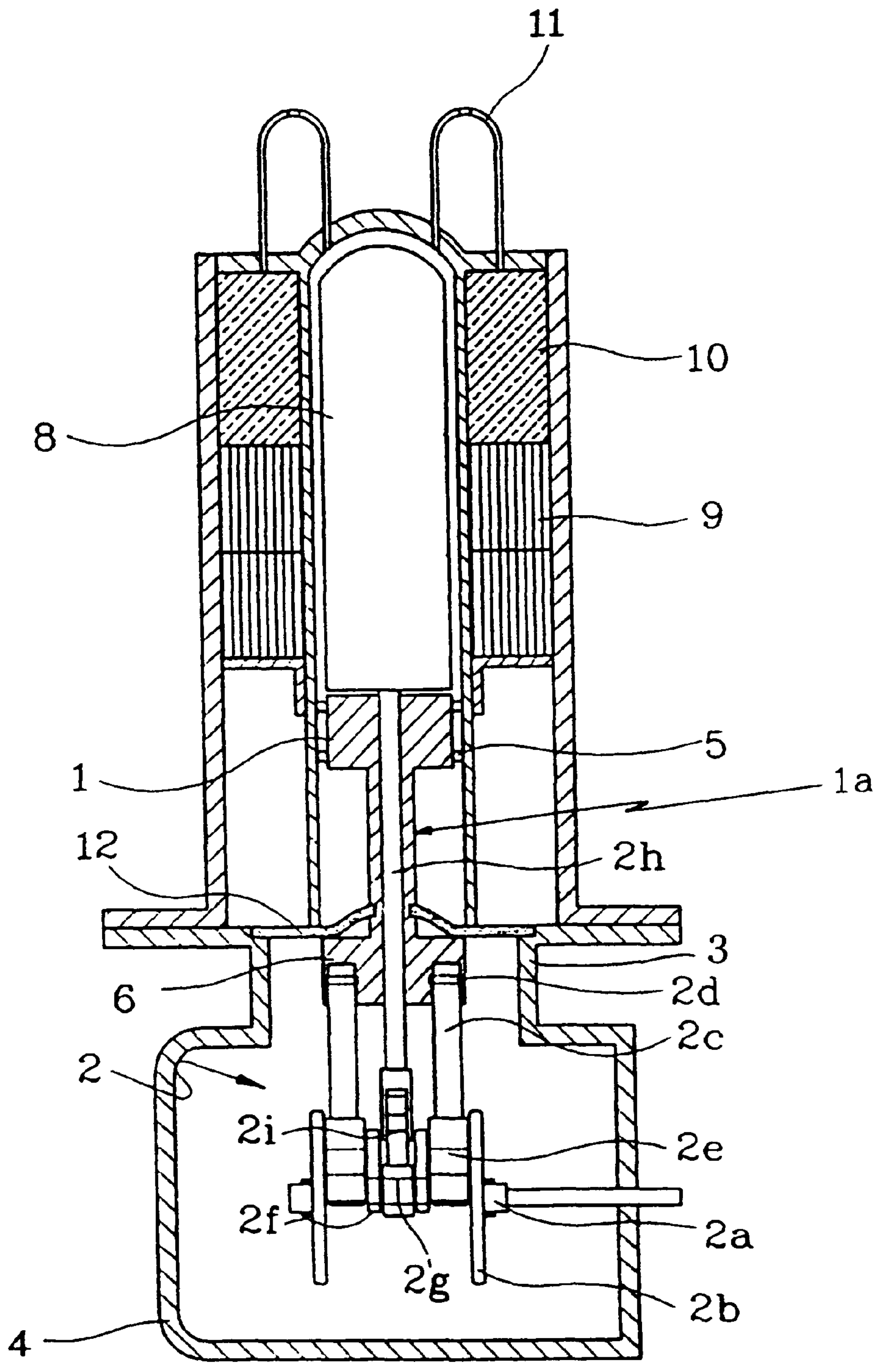
FIGS. 4A through 4C are sectional views illustrating the operation of the stirling cycle machine having the piston supporting structure of the present invention.
Figure 4B:
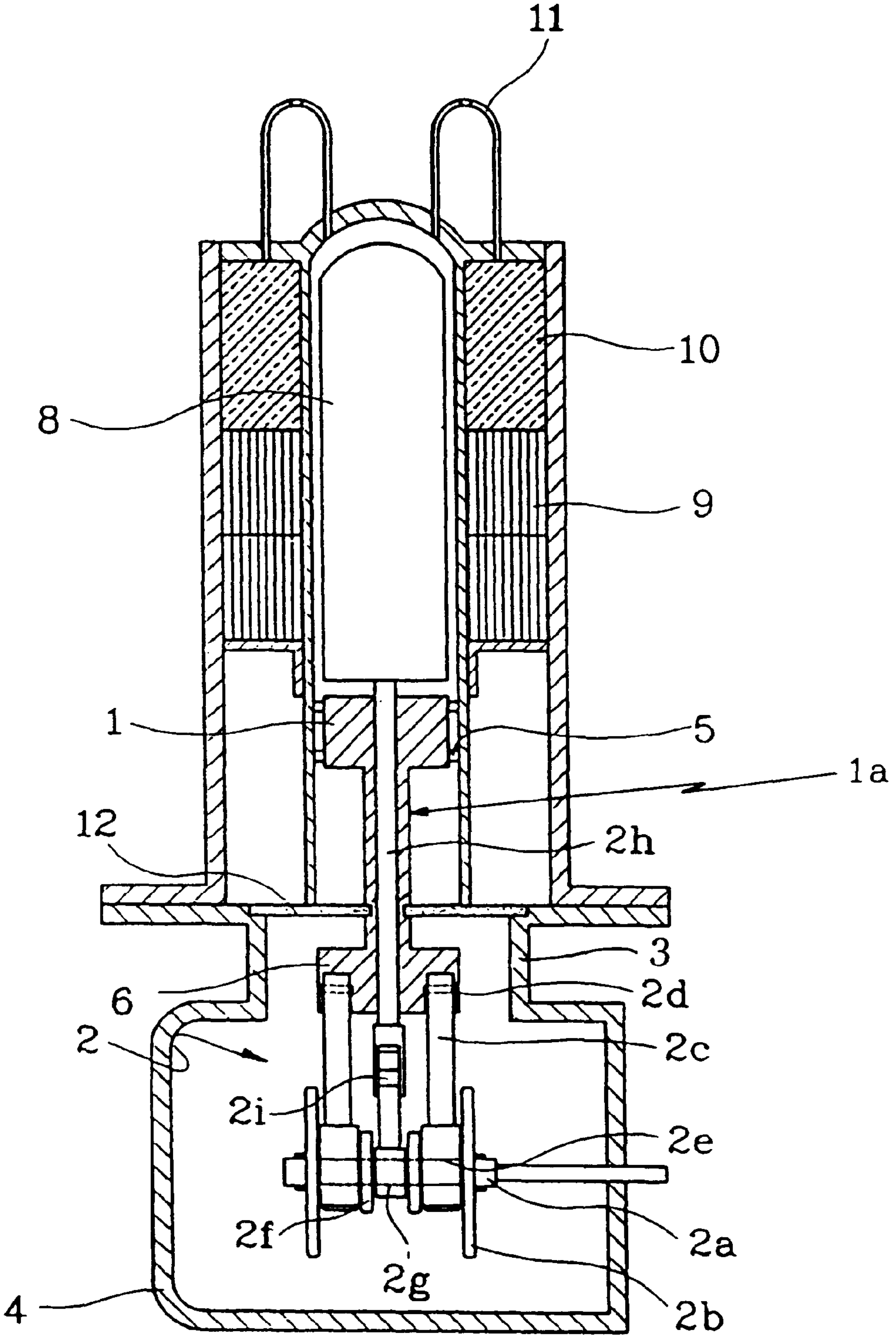
Figure 4C:
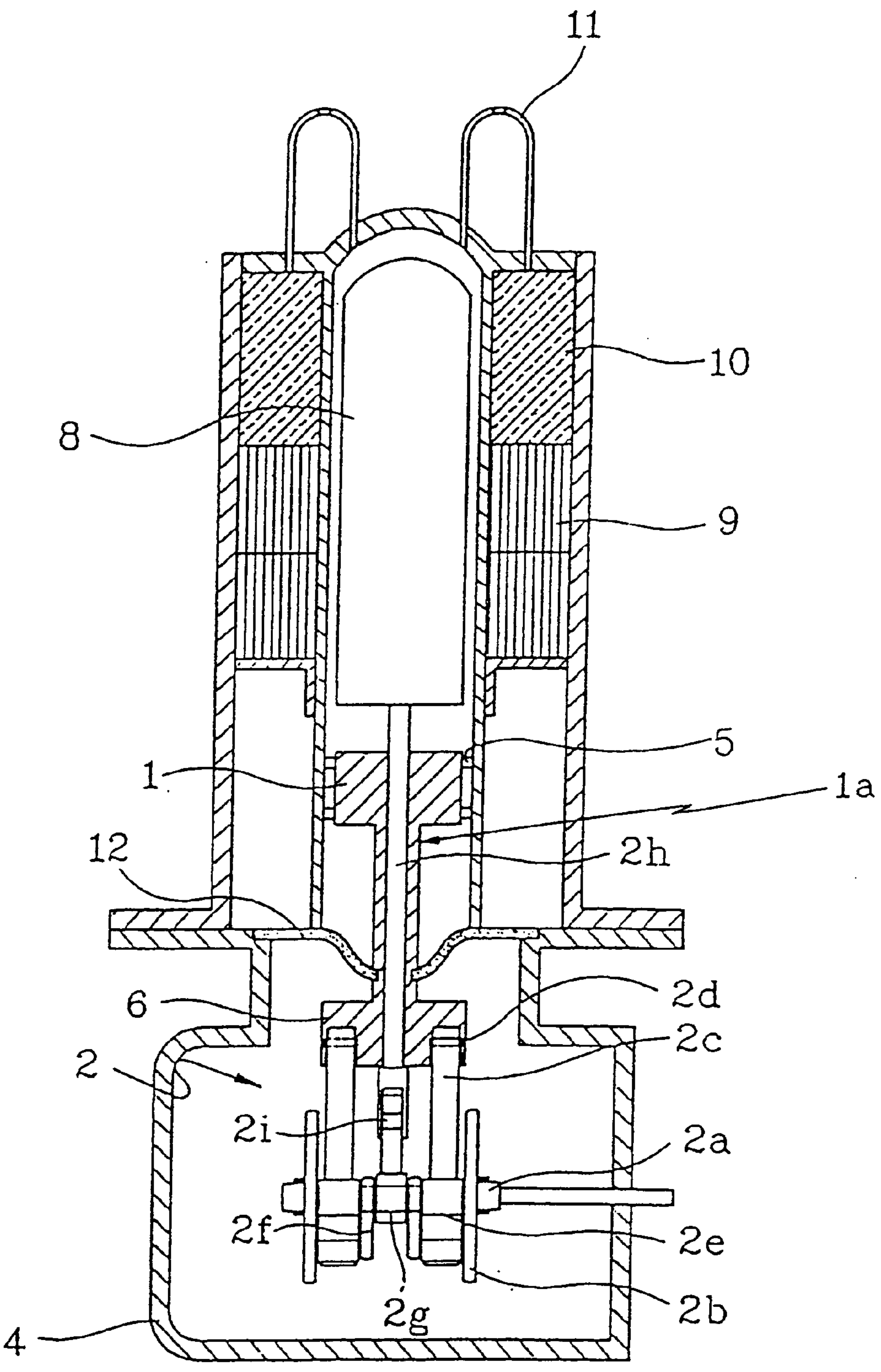

As shown in FIGS. 2 through 4, when a driving force is generated in the piston driving mechanism 2 to reciprocate the piston 1 in the stirling cycle machine, the piston 1 (having the piston seal 5 on the outer circumferential surface thereof) makes compressive reciprocal movement in the cylinder 3.

Here, vibration of the piston 1 is prevented by the leaf spring 12 fixed by the cylinder 3 and supported by the hollow rod portion 1*a* at the lower end of the piston 1.

That is, since the inner rib 13 of the leaf spring 12 is supported by the hollow rod portion 1*a* at the lower end of the piston 1, the outer rib 14 thereof is fixed by the cylinder 3, and the inner and outer ribs 13 and 14 are incorporated by the arms 15, when the piston 1 reciprocates, the inner rib 13 simultaneously reciprocates in accordance with the movements of the piston 1, thereby leading to the smooth movement of the piston 1.

Also, since the outer rib 14 of leaf spring 12 is fixed by the cylinder 3, when the piston 1 reciprocates, the vibration of the piston 1 can be prevented.

Furthermore, since the inner rib 13 is incorporated with the outer rib 14 by the arms 15, when the piston 1 reciprocates, the inner rib 13 moves up and down while maintaining its geometrical concentricity.

Figure 5:
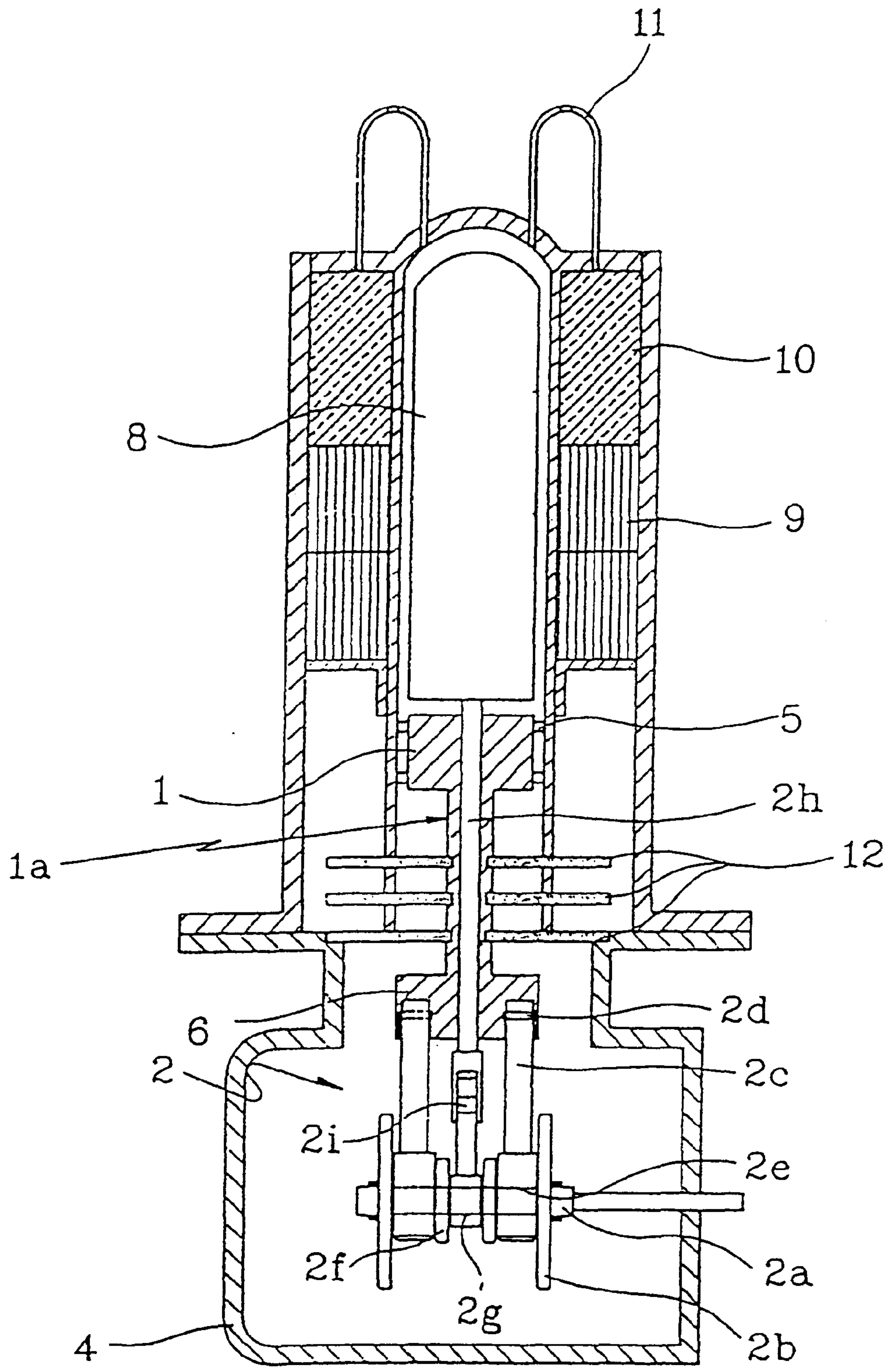
FIG. 5 is a sectional view of a stirling cycle machine having a piston supporting structure according to another embodiment of the present invention.

Meanwhile, FIG. 5 illustrates another embodiment of a stirling cycle machine having the piston supporting structure of the present invention. Here, a plurality of leaf springs 12 are provided to improve linearity of the piston movement while preventing the vibration thereof.

As described above, the present invention is effective in preventing vibration of a piston while reciprocating the piston without frictional contact by replacing a cross head for preventing the vibration of the piston with a leaf spring fixed by a rod at the lower end of the piston and a cylinder.

What is claimed is:

1. A Stirling engine comprising:

a case having a space defined therein;

a displacer slidably disposed in said space;

a piston member slidably disposed in said space, said piston member including a hollow rod portion;

a piston driving mechanism connected to said piston member arm 2*c* and connected to said displacer via a displacer rod passing through said hollow rod portion, and being constructed and arranged to reciprocally drive said piston member and said displacer;

a leaf spring member having a first portion fixedly connected to said hollow rod portion and a second portion fixedly connected to said case, whereby said leaf spring oscillates in accordance with said reciprocal driving of said piston member.

2. The Stirling engine according to claim 1, wherein said leaf spring member comprises:

an inner rib fixedly connected to said hollow rod portion;

an outer rib fixedly connected to said case; and a plurality of arms connected said inner and outer ribs.

3. The Stirling engine according to claim 2, wherein said arms are curved.

4. The Stirling engine according to claim 1, further comprising a cross head provided between said piston member and said piston driving mechanism.

5. The Stirling engine according to claim 4, wherein said leaf spring member is provided between said piston member and said cross head.

6. The Stirling engine according to claim 5, comprising a plurality of said leaf spring members.

7. The Stirling engine according to claim 1, wherein said leaf spring member is constructed and arranged to prevent movement of said shaft transverse to a direction along which said piston member reciprocates.

* * * * *